(12) United States Patent
Hirose et al.

(10) Patent No.: US 12,160,788 B2
(45) Date of Patent: Dec. 3, 2024

(54) POSITION ESTIMATION METHOD FOR MOBILE TERMINAL, POSITION ESTIMATION DEVICE FOR MOBILE TERMINAL AND POSITION ESTIMATION SYSTEM FOR MOBILE TERMINAL

(71) Applicant: AISIN CORPORATION, Aichi (JP)

(72) Inventors: Hideaki Hirose, Kariya (JP); Takahiro Kako, Kariya (JP); Michihiro Ogura, Kariya (JP); Hiroaki Yamamoto, Kariya (JP); Kenichi Taguchi, Kariya (JP); Nobuyasu Miwa, Kariya (JP)

(73) Assignee: AISIN CORPORATION, Aichi (JP)

( * ) Notice: Subject to any disclaimer, the term of this patent is extended or adjusted under 35 U.S.C. 154(b) by 423 days.

(21) Appl. No.: 17/528,399

(22) Filed: Nov. 17, 2021

(65) Prior Publication Data

US 2022/0167117 A1 May 26, 2022

(30) Foreign Application Priority Data

Nov. 24, 2020 (JP) ................................ 2020-194640

(51) Int. Cl.
*H04W 4/02* (2018.01)
*G01S 5/02* (2010.01)
(52) U.S. Cl.
CPC ........... *H04W 4/023* (2013.01); *G01S 5/0278* (2013.01)
(58) Field of Classification Search
CPC ....... H04W 4/02; H04W 4/029; H04W 4/021; H04W 4/025; H04W 4/023; H04W 4/027;
(Continued)

(56) References Cited

U.S. PATENT DOCUMENTS 7,962,150 B2   6/2011  Hertzog et al.
8,180,379 B2*  5/2012  Forstall ................. H04W 4/024
                                                          455/456.6
(Continued)

FOREIGN PATENT DOCUMENTS

JP   2009-253494 A   10/2009
JP   2011-099809 A    5/2011
(Continued)

*Primary Examiner* — Diana J. Cheng
(74) *Attorney, Agent, or Firm* — Sughrue Mion, PLLC (57) ABSTRACT

A position estimation method for estimating a position of a mobile terminal includes: an acquisition step of acquiring distance values and radio wave intensity values between communication devices provided in a vehicle and the mobile terminal by communicating the communication devices with the mobile terminal; a communication availability determination step of determining that a corresponding communication device is communicable when the distance value is not more than a first value and the intensity value is not less than a second value; an area determination step of, based on a result of the communication availability determination step and communication maps mapping communicable ranges of the communication devices, determining an area where the mobile terminal exists by superimposing the communication maps; and an estimation step of estimating the position of the mobile terminal based on a result of the area determination step.

16 Claims, 7 Drawing Sheets

(58) Field of Classification Search
CPC ..... H04W 64/00; H04W 4/026; H04W 4/024; H04W 4/00
See application file for complete search history.

(56) References Cited

U.S. PATENT DOCUMENTS

| | | |
|---|---|---|
| 8,930,045 B2 | 1/2015 | Oman et al. |
| 9,679,430 B2 | 6/2017 | O'Brien et al. |
| 2021/0092704 A1 | 3/2021 | Kusumoto et al. |

FOREIGN PATENT DOCUMENTS

| | | |
|---|---|---|
| JP | 2019-203785 A | 11/2019 |
| JP | 2019-215303 A | 12/2019 |
| JP | 2020-071199 A | 5/2020 |
| JP | 2020-112418 A | 7/2020 |
| JP | 2020-122727 A | 8/2020 |

\* cited by examiner

POSITION ESTIMATION METHOD FOR MOBILE TERMINAL, POSITION ESTIMATION DEVICE FOR MOBILE TERMINAL AND POSITION ESTIMATION SYSTEM FOR MOBILE TERMINAL

CROSS REFERENCE TO RELATED APPLICATIONS

This application is based on and claims priority under 35 U.S.C. § 119 to Japanese Patent Application 2020-194640, filed on Nov. 24, 2020, the entire content of which is incorporated herein by reference.

TECHNICAL FIELD

This disclosure relates to a position estimation method for a mobile terminal, a position estimation device for a mobile terminal and a position estimation system for a mobile terminal which estimate the position of a mobile terminal in a vicinity of a vehicle.

BACKGROUND DISCUSSION

In the related art, there has been known a technique of estimating a position of a mobile terminal constituted with a smart key, a smartphone or the like, and unlocking a vehicle door or the like based on the estimated position of the mobile terminal (for example, see JP 2020-112418A (Reference 1) and JP 2020-122727A (Reference 2)).

A position estimation method for a mobile terminal described in Reference 1 estimates the position of a mobile terminal based on a low frequency (LF) band signal transmitted from a vehicle side and an ultra high frequency (UHF) band signal transmitted from the mobile terminal. However, a theft (so-called relay attack) caused by relaying these signals to unlock a vehicle door has become a problem, and in order to solve this problem, a technique of unlocking the vehicle door only when the position of a mobile terminal body can be detected near the vehicle has been developed. In order to accurately estimate the position of the mobile terminal, there has been known a position estimation method for a mobile terminal having an improved ranging performance though a high-speed communication using an ultra wide band (UWB) band signal (for example, see Reference 2).

The position estimation method for a mobile terminal described in Reference 1 prepares an intensity distribution map of LF transmitting antennas in advance, and identifies a coverage area of an antenna with the highest reception intensity from the mobile terminal as a candidate area where the mobile terminal may exist, and sets candidate points in this candidate area. A reception intensity estimated value for each antenna is acquired for each of the set candidate points, and a candidate point where the residual sum of squares of an observed value of the reception intensity and the reception intensity estimated value is minimized is estimated as the position of the mobile terminal.

A position estimation method for a mobile terminal described in Reference 2 calculates position coordinates of the mobile terminal when there are three or more in-vehicle communication devices capable of communicating with the mobile terminal, and determines whether the mobile terminal exists in a system operating area when there are less than three in-vehicle communication devices capable of communicating with the mobile terminal. In the determination as to whether the mobile terminal exists in the system operating area, a distance to the mobile terminal is calculated by using a communication device that is communicable, and a rough existence area of the mobile terminal is determined.

Since the position estimation method for a mobile terminal described in Reference 1 sets the coverage area of the antenna having the highest reception intensity as a candidate area, and sets a large number of candidate points in this candidate area, when the candidate area is vast, the accuracy of estimation is low.

Although in the position estimation method for a mobile terminal described in Reference 2, the distance to the mobile terminal is calculated by using the communication device that is communicable, and the rough existence area of the mobile terminal is determined, for example, since a communication device provided on the door includes communicable areas inside and outside the vehicle, it is impossible to accurately identify whether the mobile terminal exists inside the vehicle or outside the vehicle.

A need thus exists for a position estimation method for a mobile terminal, a position estimation device for a mobile terminal, and a position estimation system for a mobile terminal which are not susceptible to the drawback mentioned above.

SUMMARY

A position estimation method for a mobile terminal according to this disclosure is a position estimation method for a mobile terminal that estimates a position of a mobile terminal by communicating a plurality of communication devices provided in a vehicle with the mobile terminal in a vicinity of the vehicle, and the position estimation method includes: an acquisition step of acquiring distance values and radio wave intensity values between the plurality of communication devices and the mobile terminal by communicating the communication devices with the mobile terminal; a communication availability determination step of determining that a corresponding communication device is communicable when the distance value is equal to or less than a first predetermined value and the intensity value is equal to or more than a second predetermined value; an area determination step of, based on a determination result of the communication availability determination step and communication maps that map communicable ranges of the communication devices, determining an area where the mobile terminal exists by superimposing the communication maps; and an estimation step of estimating the position of the mobile terminal based on a determination result of the area determination step.

A position estimation device for a mobile terminal according to this disclosure is a position estimation device for a mobile terminal that estimates a position of a mobile terminal by communicating a plurality of communication devices provided in a vehicle with the mobile terminal in a vicinity of the vehicle, and the position estimation device includes: a signal processing unit configured to acquire distance values and radio wave intensity values between the plurality of communication devices and the mobile terminal by communicating the communication devices with the mobile terminal, and determine that a corresponding communication device is communicable when the distance value is equal to or less than a first predetermined value and the intensity value is equal to or more than a second predetermined value; an area determining unit configured to, based on a determination result of the signal processing unit and communication maps that map communicable ranges of the communication devices, determine an area where the mobile terminal exists by superimposing the communication maps; and an estimation unit configured to estimate the position of the mobile terminal based on a determination result of the area determining unit.

A position estimation system for a mobile terminal according to this disclosure includes: a plurality of communication devices provided in a vehicle; a signal processing unit configured to acquire distance values and radio wave intensity values between the plurality of communication devices and a mobile terminal in a vicinity of the vehicle by communicating the communication devices with the mobile terminal, and determine that a corresponding communication device is communicable when the distance value is equal to or less than a first predetermined value and the intensity value is equal to or more than a second predetermined value; an area determining unit configured to, based on a determination result of the signal processing unit and communication maps that map communicable ranges of the communication devices, determine an area where the mobile terminal exists by superimposing the communication maps; and an estimation unit configured to estimate the position of the mobile terminal based on a determination result of the area determining unit.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments of a position estimation method for a mobile terminal, a position estimation device for a mobile terminal and a position estimation system for a mobile terminal disclosed here are described with reference to the drawings. As an example of the position estimation method for a mobile terminal according to this embodiment, a position estimation method for a mobile terminal using a position estimation system 100 for a mobile terminal will be described. However, this disclosure is not limited to the following embodiment, and various modifications can be made without departing from the scope of this disclosure.

[Basic Configuration]

Figure 1:
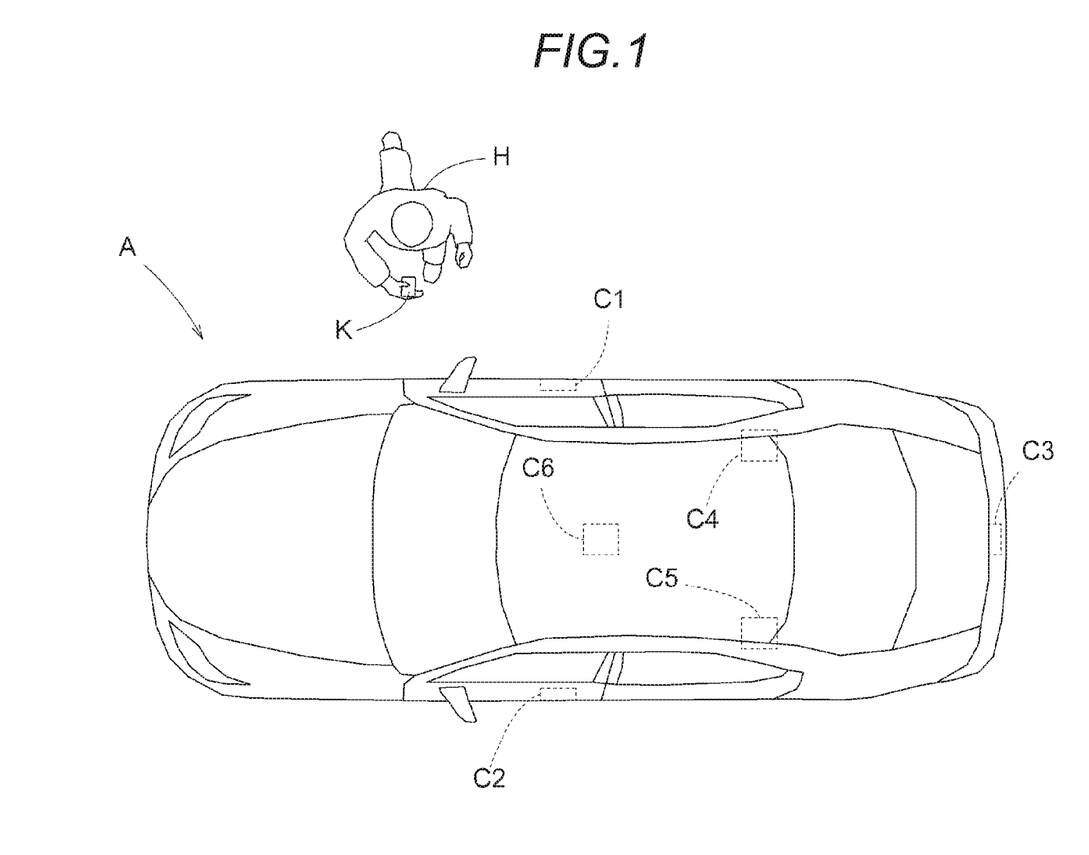
FIG. 1 is a diagram showing setting positions of communication devices.
Figure 2:
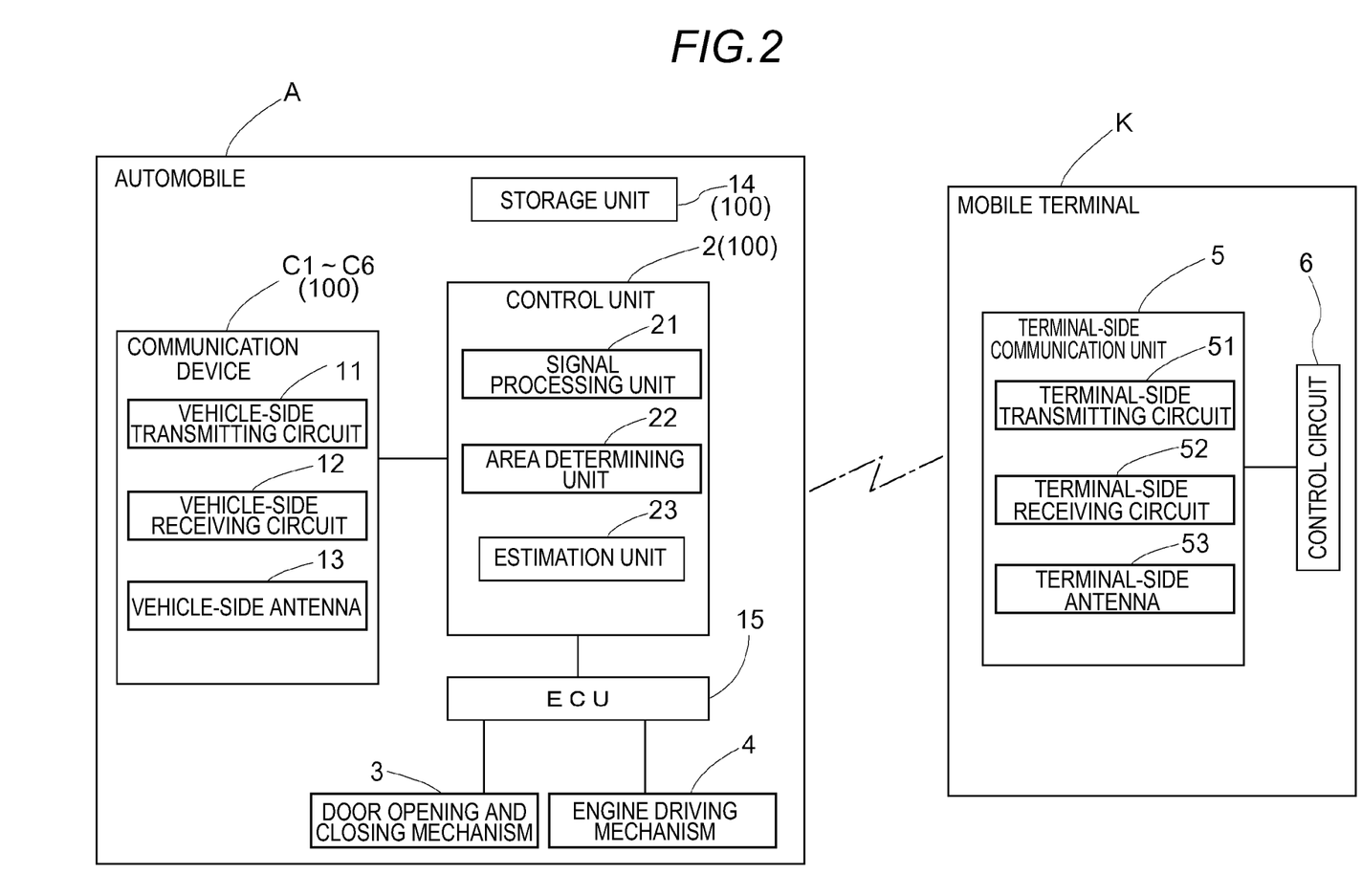
FIG. 2 is a block diagram of a position estimation system for a mobile terminal.

As shown in FIGS. 1 and 2, an automobile A (an example of a vehicle) includes the position estimation system 100 for a mobile terminal, an electronic control unit (ECU) 15, a door opening and closing mechanism 3, and an engine driving mechanism 4. The position estimation system 100 for a mobile terminal includes a plurality of communication devices C1 to C6 (six in this embodiment), a storage unit 14, and a control unit 2. Further, in the position estimation system 100 for a mobile terminal, the storage unit 14 and the control unit 2 are configured as a position estimation device for a mobile terminal. A mobile terminal K includes a terminal-side communication unit 5 and a control circuit 6. The control unit 2 and the ECU 15 are capable of reading and writing predetermined data with respect to the storage unit 14, and the communication devices C1 to C6, the control unit 2, the ECU 15, the door opening and closing mechanism 3 and the engine driving mechanism 4 are electrically connected, for example, through a communication line in the automobile such as control area network (CAN) or local interconnect network (LIN) so as to perform bidirectional communication. The mobile terminal K includes a smartphone, a smart key and the like, and hereafter, the mobile terminal K is described as a smartphone.

In the position estimation method for a mobile terminal according to this embodiment, the position estimation system 100 for a mobile terminal is used so as to estimate the position of the mobile terminal K in the vicinity of the automobile A by communication between the communication devices C1 to C6 provided in the automobile A and the mobile terminal K owned by a user H.

The communication devices C1 to C6 are provided inside resin parts of the automobile A. In order to accurately estimate the position of the mobile terminal K that may exist inside and outside a vehicle cabin, the communication devices C1 to C6 are preferably provided inside and outside the vehicle cabin of the automobile A, respectively. Positions where these communication devices C1 to C6 are provided include the inside of a door handle, a molding, a bumper or an emblem if it is outside the vehicle cabin, and include the inside of an A, B, C or D pillar, a center console box or a front console box if it is inside the vehicle cabin. In this embodiment, a first communication device C1 is provided inside a right door handle, a second communication device C2 is provided inside a left door handle, a third communication device C3 is provided inside a back emblem, a fourth communication device C4 is provided inside a right C pillar, a fifth communication device C5 is provided inside a left C pillar, and a sixth communication device C6 is provided inside the center console box.

The communication devices C1 to C6 are ultra wide band wireless devices using a signal in an ultra wide band (UWB) band. UWB communication is a wireless communication using a bandwidth of 500 MHz or more, and in this embodiment, a frequency band of 3 GHz to 10 GHz is used. This UWB communication has a feature of low power consumption and resistance to interfering radio waves, and is suitable for short-distance communication with a radius of about 10 m. In this range, it is possible to estimate the position of the mobile terminal K with a communication error of about several centimeters to several tens centimeters.

Each of the communication devices C1 to C6 has a vehicle-side transmitting circuit 11, a vehicle-side receiving circuit 12, and a vehicle-side antenna 13. The communication devices C1 to C6 are controlled by the control unit 2 and are configured to perform bidirectional communication with the control unit 2. The "circuit" in this embodiment is a general form which, for example, includes a circuit mounted with a plurality of electronic components on one substrate, and a so-called integrated circuit (IC) in which functions of a plurality of electronic components are integrated into one chip. The same also applies to the following.

The vehicle-side transmitting circuit 11 is a polling message generation circuit that generates a response request signal with respect to the mobile terminal K. Regarding a timing at which the vehicle-side transmitting circuit 11 generates a response request signal, the generation may always be performed, or may be performed periodically when the mobile terminal K is detected by other communication (for example, wireless communication by Bluetooth (registered trademark)). The vehicle-side transmitting circuit 11 modulates an input signal from the control unit 2 by a known modulation method, emits a response request signal as a radio wave from the vehicle-side antenna 13, and starts a time counting at a timing when this response request signal is transmitted.

The vehicle-side receiving circuit 12 is a response message receiving circuit that receives a response signal from the mobile terminal K. The vehicle-side receiving circuit 12 demodulates the response signal received by the vehicle-side antenna 13, transmits the response signal to the control unit 2, and ends the time counting at a timing when the response signal is received. The response signal received by the vehicle-side receiving circuit 12 includes an intensity value of the received radio wave, a time Tb required for the mobile terminal K to transmit a response signal after receiving a radio wave, and identification information (ID) of the mobile terminal K. The response signal received by the vehicle-side receiving circuit 12 is transmitted to the control unit 2, and the mobile terminal K is collated by the control unit 2, and the distance value between the authenticated mobile terminal K and each of the communication devices C1 to C6 is calculated.

The distance value between each of the communication devices C1 to C6 and the mobile terminal K can be calculated by, for example, single-sided two-way ranging method (TWR-SS) based on a time of flight (TOF) method. According to the single-sided two-way ranging method, the distance value is calculated by multiplying half of a difference, which is acquired by subtracting the time Tb required for the mobile terminal K to transmit a response signal after receiving a response request signal from a time Ta required for transmitting the response request signal from the vehicle-side antenna 13 and then receiving the response signal, that is, ((Ta−Tb)/2), by a propagation speed V of the radio wave, that is, (V×(Ta−Tb)/2). In this embodiment, although this distance value is calculated by the control unit 2, this distance value may be calculated by each of the communication devices C1 to C6.

The vehicle-side antenna 13 emits a response request signal modulated by the vehicle-side transmitting circuit 11 as a radio wave, and receives a response signal from the mobile terminal K as a radio wave. The vehicle-side antenna 13 may be provided with a transmitting antenna for transmitting a response request signal and a receiving antenna for receiving the response signal separately, or the transmitting antenna and the receiving antenna may be shared by one antenna element.

The storage unit 14 is constituted with hardware such as an HDD and a ROM, and stores a program run by the control unit 2 or the ECU 15, three-dimensional position coordinates of the communication devices C1 to C6 with an optional position of the automobile A (for example, the position of the first communication device C1) as an origin, and communication maps M1 to M6 (see FIG. 6) in which the communicable ranges of the communication devices C1 to C6 are mapped.

The control unit 2 controls operations of the communication devices C1 to C6, and processes signals received from the communication devices C1 to C6 so as to estimate the position of the mobile terminal K and output an estimation result to the ECU 15. Further, the ECU 15 controls operations of the door opening and closing mechanism 3 and the engine driving mechanism 4 based on the position of the mobile terminal K estimated by the control unit 2 (a keyless entry system). A detailed configuration of the control unit 2 will be described later.

The door opening and closing mechanism 3 includes a key door button, a touch sensor or the like by which the user H unlocks or locks the vehicle door. Since the door opening and closing mechanism 3 is a well-known mechanism in which the user H presses the key door button or touches the touch sensor with a hand so as to unlock or lock the vehicle door, detailed descriptions are omitted. In this embodiment, the ECU 15 transmits an operation signal to the door opening and closing mechanism 3 based on the position of the mobile terminal K estimated by the control unit 2, so that the user H can unlock or lock a vehicle door near the mobile terminal K without pressing the key door button, or the like. Further, the ECU 15 transmits an operation signal to the door opening and closing mechanism 3 based on the position of the mobile terminal K estimated by the control unit 2, so that the user H can open or close the vehicle door near the mobile terminal K.

The engine driving mechanism 4 has a mobile starter, a push switch or the like by which the user H drives the engine of the automobile A. Since the engine driving mechanism 4 is a well-known mechanism in which the user H presses the starter or the push switch so as to cause the engine to be driven by a cell motor, the detailed descriptions are omitted. In this embodiment, when the control unit 2 estimates that the mobile terminal K exists inside the vehicle cabin, the ECU 15 transmits an operation signal to the engine driving mechanism 4, and the engine is in a drivable standby state.

As described above, the mobile terminal K includes the terminal-side communication unit 5 and the control circuit 6. The terminal-side communication unit 5 includes a terminal-side transmitting circuit 51, a terminal-side receiving circuit 52 and a terminal-side antenna 53.

The terminal-side receiving circuit 52 receives a response request signal transmitted from the vehicle-side antenna 13 via the terminal-side antenna 53, and the terminal-side transmitting circuit 51 transmits a response signal to the vehicle-side antenna 13 via the terminal-side antenna 53. The terminal-side receiving circuit 52 demodulates the response signal received from the terminal-side antenna 53 and transmits the response signal to the control circuit 6. The terminal-side transmitting circuit 51 transmits a response signal acquired by modulating an input signal from the control circuit 6 with a well-known modulation method from the terminal-side antenna 53 to the vehicle-side antenna 13. The control circuit 6 generates an input signal including the time Tb required for the mobile terminal K to transmit a response signal after receiving a radio wave and the identification information (ID) of the mobile terminal K. In addition, the time Tb required from the reception of a radio wave by the mobile terminal K to response may be a preset time, and may be a time measured each time a radio wave is received.

[Details of Control Unit]

The control unit 2 includes a signal processing unit 21, an area determining unit 22 and an estimation unit 23. Each functional unit of the control unit 2 is configured by software using a CPU that executes various processes and a memory as cores, or collaboration between hardware and software.

The signal processing unit 21 processes electrical signals transmitted and received between the communication devices C1 to C6. The signal processing unit 21 executes a polling control of each of the communication devices C1 to C6, calculates and acquires the distance value between each of the communication devices C1 to C6 mentioned above and the mobile terminal K, and also acquires the radio wave intensity value from the mobile terminal K received by each of the communication devices C1 to C6 (an acquisition step, see FIG. 5).

The signal processing unit 21 determines that the communication devices C1 to C6 are communicable when the distance value from each of the communication devices C1 to C6 is equal to or less than a first predetermined value and the intensity value from each of the communication devices C1 to C6 is equal to or more than a second predetermined value (a communication availability determination step). However, the signal processing unit 21 determines that the communication devices C1 to C6 are not communicable when the distance value from each of the communication devices C1 to C6 is more than the first predetermined value, or when the intensity value from each of the communication devices C1 to C6 is less than the second predetermined value (the communication availability determination step). The first predetermined value is set as a value (for example, 10 m) that is so large that the value is theoretically unrealistic as the ranging value, may be set according to a provided location of each of the communication devices C1 to C6, or may be set uniformly. The second predetermined value is set as a value (for example, −105 dBm) that can be regarded as a noise level, may be set according to the provided location of each of the communication devices C1 to C6, or may be set uniformly.

The area determining unit 22 determines an area where the mobile terminal K exists by superimposing some of communication maps M1 to M6 of the communication devices C1 to C6 which are determined to be communicable by the signal processing unit 21 and the other communication maps M1 to M6 of the communication devices C1 to C6 which are determined to be non-communicable by the signal processing unit 21 (an area determination step). The communication maps M1 to M6 in this embodiment are formed with two-dimensional coordinates set in advance according to setting positions of the communication devices C1 to C6, and set a range in which a distance to the mobile terminal K can be measured with less communication error or small radio wave loss as the communicable range. In addition, the communication maps M1 to M6 may have three-dimensional coordinates. Here, the communication error is a difference between a true distance and a measured distance value of the distance values that can be measured by the communication devices C1 to C6. Hereafter, the communication error will be described as a ranging error.

Figure 6:
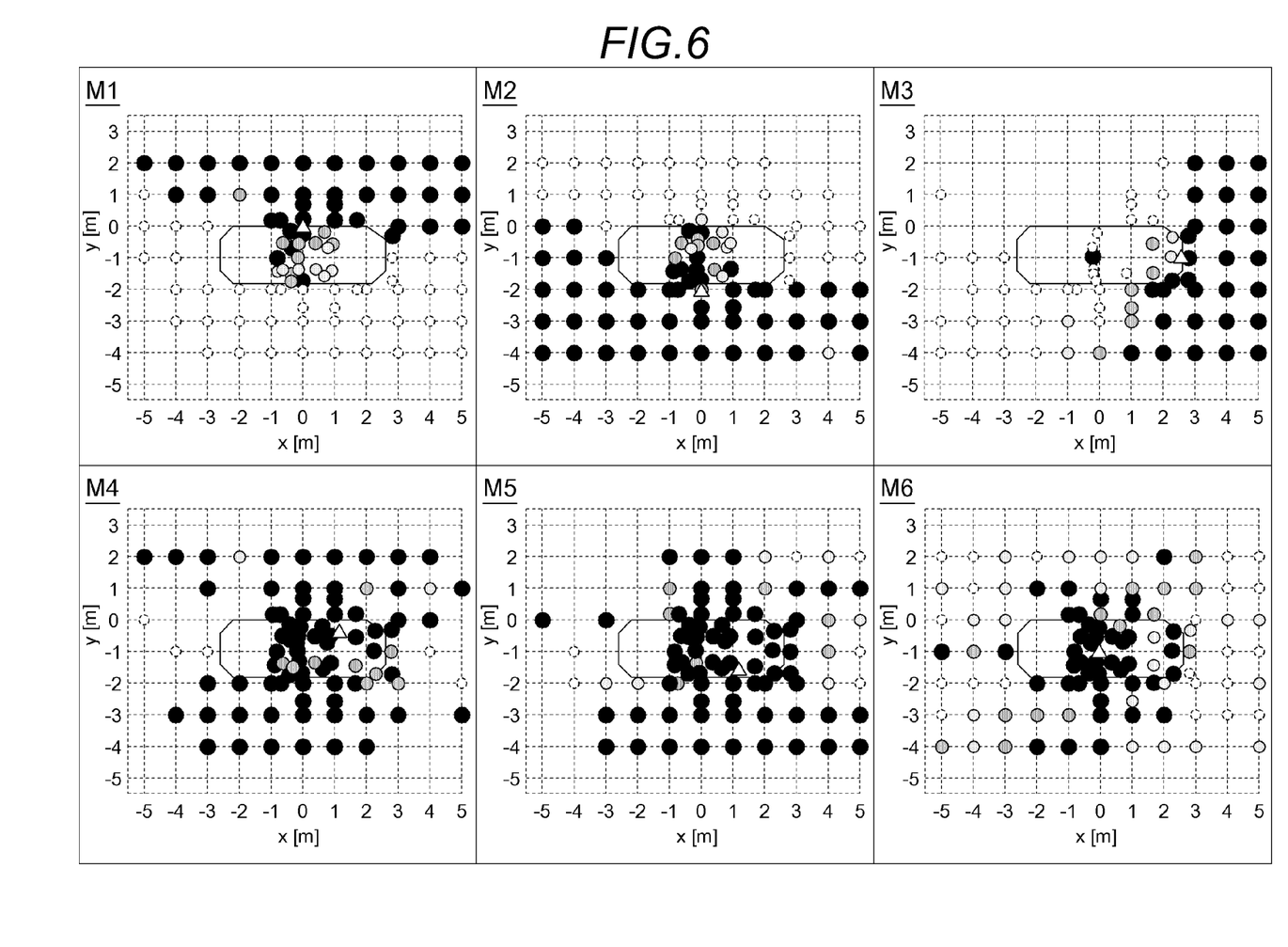
FIG. 6 is an example of communication maps.

FIG. 6 shows communication maps M1 to M6 of the communication devices C1 to C6 in consideration of an ideal ranging error in the absence of disturbance. In FIG. 6, ranges with a ranging error of 50 cm or less are indicated by dark black solid-line circles, ranges with a ranging error of more than 50 cm and 1 m or less are indicated by dark gray circles, ranges with a ranging error of more than 1 m and 3 m or less are indicated by light gray solid-line circles, ranges with a ranging error of more than 3 m are indicated by broken-line circles, and the positions of the communication devices C1 to C6 are indicated by triangular marks. That is, the communication maps M1 to M6 in this embodiment classify the communicable ranges into ranks according to the degree of communication error (ranging error).

The first communication device C1 is communicable with a slight ranging error when the mobile terminal K exists on the right side of the vehicle and exists in the vicinity of a driver seat inside the vehicle cabin (see the communication map M1). The second communication device C2 is communicable with a slight ranging error when the mobile terminal K exists on the left side of the vehicle and exists in the vicinity of a front passenger seat inside the vehicle cabin (see the communication map M2). The third communication device C3 is communicable with a slight ranging error when the mobile terminal K exists behind the vehicle (see the communication map M3). The fourth communication device C4 is communicable with a slight ranging error when the mobile terminal K exists on the left and right sides of the vehicle and inside the vehicle cabin, and is communicable with less disturbance when the mobile terminal K exists on the right side of the vehicle (see the communication map M4). The fifth communication device C5 is communicable with a slight ranging error when the mobile terminal K exists on the left and right sides of the vehicle and inside the vehicle cabin, and is communicable with less disturbance when the mobile terminal K exists on the left side of the vehicle (see the communication map M5). The sixth communication device C6 is communicable with a slight ranging error when the mobile terminal K exists inside the vehicle cabin (see the communication map M6).

For example, when the first communication device C1 is determined to be communicable by the signal processing unit 21, and when the mobile terminal K is only communicable with the second communication device C2 at a noise level and the second communication device C2 is determined to be non-communicable by the signal processing unit 21, the area determining unit 22 excludes the communicable range of the communication map M2 of the second communication device C2 from the communicable range of the communication map M1 of the first communication device C1. Therefore, the mobile terminal K can be estimated to be located on the right side of the vehicle. In this way, an overlapping region of the communicable ranges is converged by superimposing all the communication maps M1 to M6, and the existence area of the mobile terminal K can be accurately identified.

The area determining unit 22 in this embodiment excludes a logical product of the communicable ranges of some of the communication devices C1 to C6 which are determined to be non-communicable by the signal processing unit 21 from the logical product of the communicable ranges of the other communication devices C1 to C6 which are determined to be communicable by the signal processing unit 21. In this case, the area determining unit 22 may make the ranks of the communicable ranges of some of the communication devices C1 to C6 which are determined to be communicable different from the ranks of the communicable ranges of the other communication devices C1 to C6 which are determined to be non-communicable. That is, the area determining unit 22 may perform the weighting based on the ranks of the communicable ranges of the communication devices C1 to C6 and superimpose the communication maps M1 to M6. For example, if the communicable ranges with a smaller ranging error of some of the communication devices C1 to C6 which are communicable are used other than the other communication devices C1 to C6 to be excluded which are non-communicable, the position of the mobile terminal K can be estimated accurately.

The estimation unit 23 estimates the position of the mobile terminal K based on a determination result of the area determining unit 22, and outputs an estimation result to the ECU 15 (the estimation step). When the estimation unit 23 estimates that the mobile terminal K exists at a position on the right side of the vehicle, the ECU 15 transmits an operation signal to the door opening and closing mechanism 3 so as to unlock, lock, open or close a right door. When the estimation unit 23 estimates that the mobile terminal K exists at a position on the left side of the vehicle, the ECU 15 transmits an operation signal to the door opening and closing mechanism 3 so as to unlock, lock, open or close a left door. When the estimation unit 23 estimates that the mobile terminal K exists at a position on a rear side of the vehicle, the ECU 15 transmits an operation signal to the door opening and closing mechanism 3 so as to unlock, lock, open or close a back door. When the estimation unit 23 estimates that the mobile terminal K exists at a position inside the vehicle cabin, the ECU 15 transmits an operation signal to the engine driving mechanism 4, and the engine is in a drivable standby state.

When the determination result of the area determining unit 22 is a result with which whether the area is inside or outside the vehicle cabin can be distinguished, the estimation unit 23 may estimate the determination result of the area determining unit 22 as the position of the mobile terminal K. On the other hand, when the determination result of the area determining unit 22 is a result with which whether the area is inside or outside the vehicle cabin cannot be distinguished, the estimation unit 23 may estimate the position of the mobile terminal K by performing a weighting based on the ranks that are the degree of the communication errors of the communication maps M1 to M6. For example, as a result of the matter that the area determining unit 22 excludes the communicable range of the communication map M2 of the second communication device C2 from the communicable range of the communication map M1 of the first communication device C1, when a region with a ranging error of more than 1 m and 3 m or less exists inside the vehicle cabin and a region with a ranging error of 50 cm or less exists outside the vehicle cabin, the estimation unit 23 may estimate that the mobile terminal K exists on the right side of the vehicle outside the vehicle cabin by giving a priority to the region with the ranging error of 50 cm or less.

In an existence area of the mobile terminal K narrowed down by the area determining unit 22, the estimation unit 23 in this embodiment estimates a range existing in the existence area of the mobile terminal K in an estimation circle using the distance value from the communication device of the communication devices C1 to C6 having the smallest distance value as a radius as the position of the mobile terminal K. For example, after the range of the position of the mobile terminal K is narrowed down in an area on the right side of the vehicle outside the vehicle cabin, an estimation circle using a distance value from the first communication device C1 having the smallest distance value as a radius is drawn, and the mobile terminal K is estimated to exist on this estimation circle. Therefore, it is possible to estimate how many meters the mobile terminal K exists from the right door. In this embodiment, a reason why the estimation circle using the distance value from the communication device of the communication devices C1 to C6 having the smallest distance value as a radius is used is that when an UWB band signal is used as a communication method, the distance value acquired from the communication devices C1 to C6 includes a small value due to a direct wave and a large value due to a detouring wave that detours around a shield, and the small value due to the direct wave is closest to an actual distance value.

Further, the estimation unit 23 may estimate the position of the mobile terminal K based on a principle of triangulation in the existence area of the mobile terminal K narrowed down by the area determining unit 22. As the principle of triangulation, an optional candidate point may be provided in the two-dimensional coordinates in the existence area of the mobile terminal K so as to perform a calculation by a well-known algorithm such as least squares method, and a sphere assuming that the existence area of the mobile terminal K is a plane passing through the center of the sphere may be provided and an optional candidate point may be provided in the sphere so as to perform a calculation by a well-known algorithm such as least squares method.

[Position Estimation Method for Mobile Terminal]

An embodiment of the position estimation method for a mobile terminal will be described with reference to FIGS. 3 to 10.

The vehicle-side transmitting circuit 11 of each of the communication devices C1 to C6 generates a response request signal, and sequentially transmits the response request signal to the mobile terminal K via the vehicle-side antenna 13. An order in which the response request signals are transmitted by the communication devices C1 to C6 may be determined by giving a priority to any one of the communication devices C1 to C6 that has detected the mobile terminal K by other communication, or may be optionally set. In the mobile terminal K that has received the response request signal, the control circuit 6 generates an input signal including the time Tb required for the mobile terminal K to respond after receiving a radio wave and the identification information (ID) of the mobile terminal K, transmits the input signal to the terminal-side communication unit 5, and transmits a response signal generated by modulating an electric signal with the terminal-side communication unit 5 to the vehicle-side antenna 13 via the terminal-side antenna 53 (#31 in FIG. 3). Further, the vehicle-side receiving circuit 12 demodulates the response signal received from the vehicle-side antenna 13, transmits the response signal to the control unit 2, collates the mobile terminal K by the control unit 2, and acquires the distance value and the radio wave intensity value between the authenticated mobile terminal K and each of the communication devices C1 to C6 (#32 in FIG. 3, the acquisition step).

Figure 5:
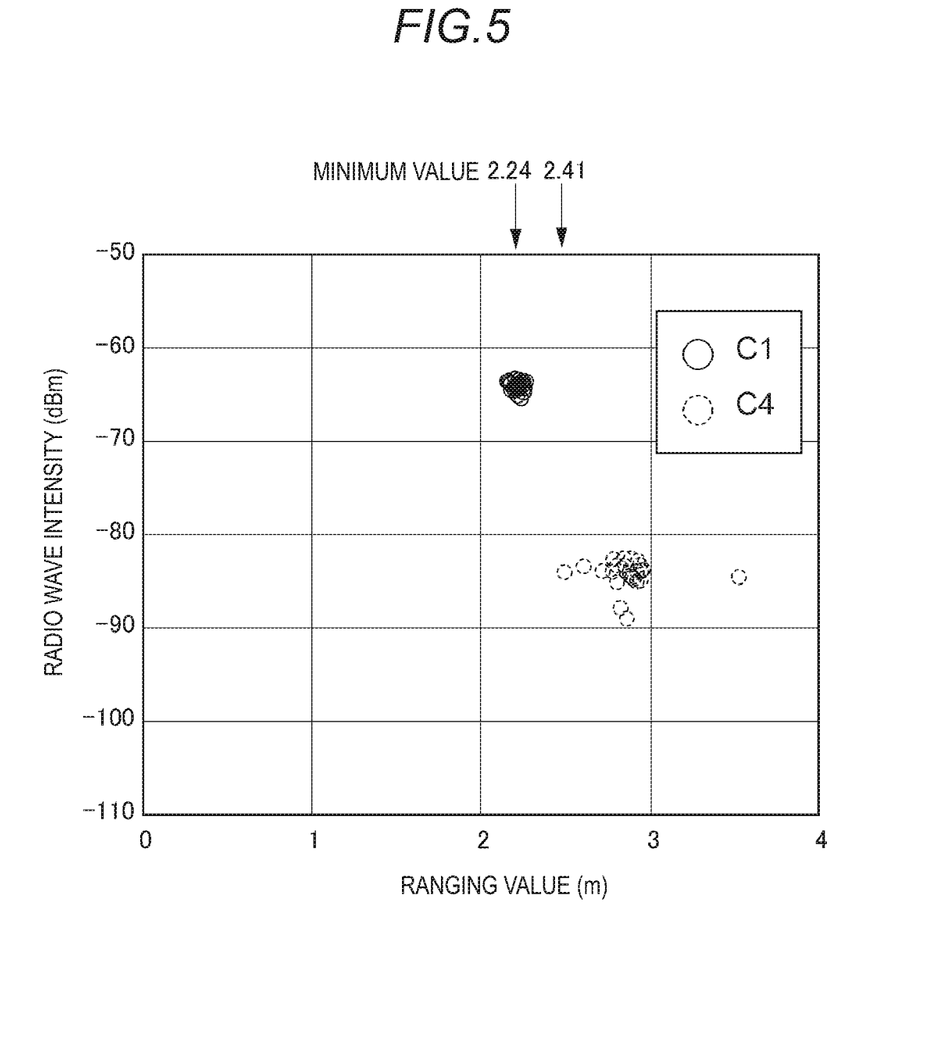
FIG. 5 shows examples of a distance value and an intensity value.
Figure 9:
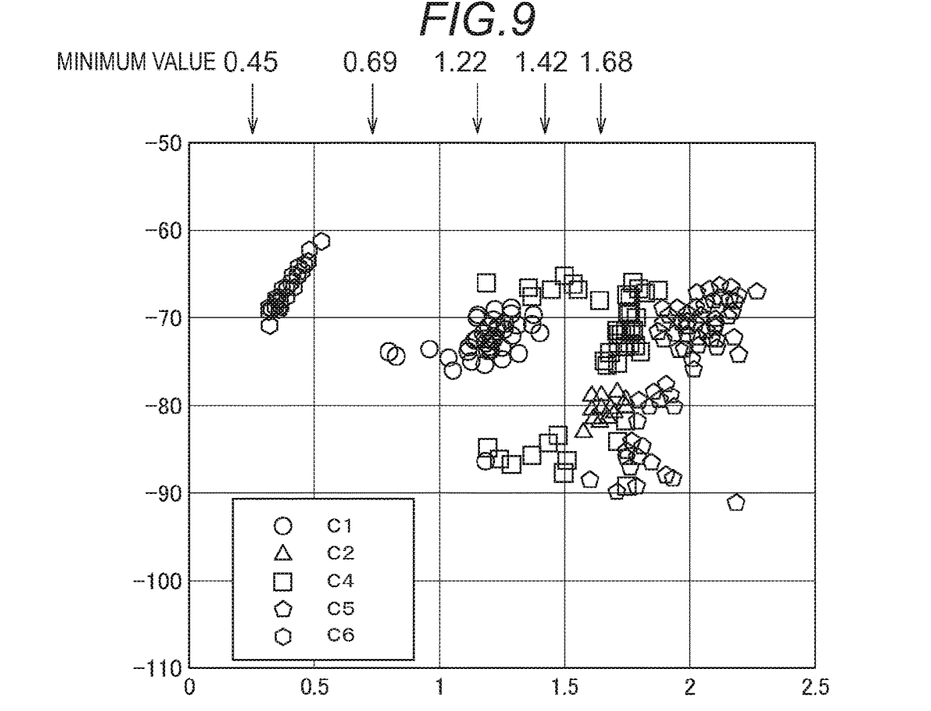
FIG. 9 shows other examples of the distance value and the intensity value.

FIGS. 5 and 9 show an example in which the distance value (ranging value) acquired by the control unit 2 is used as a horizontal axis and the radio wave intensity value (radio wave intensity) acquired by the control unit 2 is used as a vertical axis. FIG. 5 shows a ranging value and a radio wave intensity under a condition that the user H holds the mobile terminal K in a hand and stands at a position on the right side (2 m on the right side, 1 m on the back side with respect to the first communication device C1) of the automobile A. In such a case, as shown in FIG. 5, only the first communication device C1 and the fourth communication device C4 are communicable. In the example shown in FIG. 5, it is presumed that the reason why the fifth communication device C5 and the sixth communication device C6 having a ranging error of 1 m or less are non-communicable is due to the disturbance. FIG. 9 shows a ranging value and a radio wave intensity under a condition that the user H sitting in the driver seat of the automobile A puts the mobile terminal K in the chest pocket of the outerwear. In the example shown in FIG. 9, the communication devices other than the third communication device C3 are communicable.

Figure 3:
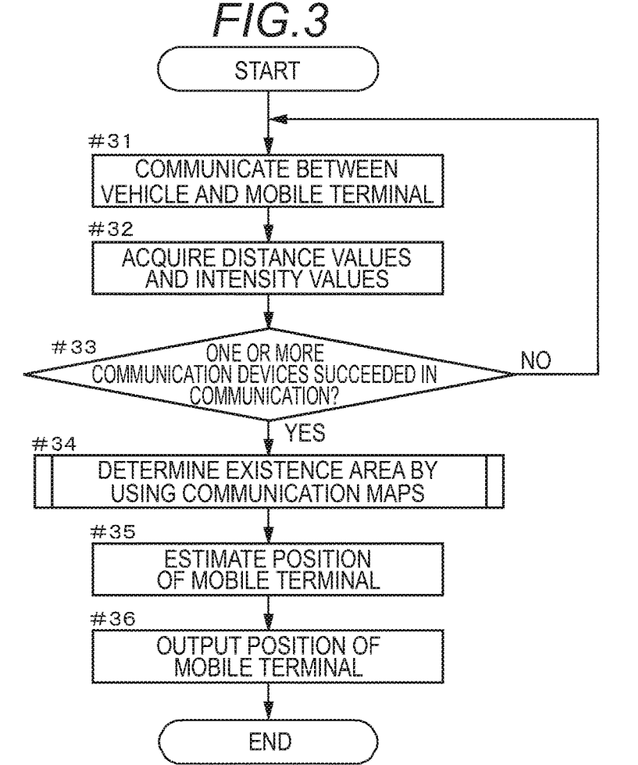
FIG. 3 is a flow diagram showing a position estimation method for a mobile terminal according to this embodiment.
Figure 4:
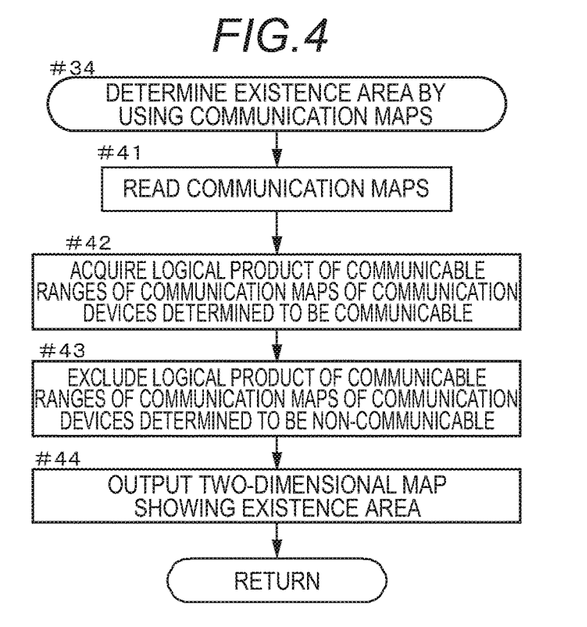
FIG. 4 is a subroutine of a determination about an existence area of a mobile terminal.

Next, the signal processing unit 21 determines whether there is one or more of the communication devices C1 to C6 which are communicable, in which the distance value of each of the communication devices C1 to C6 is equal to or less than the first predetermined value, and the intensity value of each of the communication devices C1 to C6 is equal to or more than the second predetermined value (#33 in FIG. 3, the communication availability determination step). In the example of FIG. 5, the mobile terminal K can communicate with two communication devices including the first communication device C1 and the fourth communication device C4, and in the example of FIG. 9, the mobile terminal K can communicate with five communication devices including the first communication device C1, the second communication device C2 and the fourth communication device C4 to the sixth communication device C6. When there is no one of the communication devices C1 to C6 that are communicable as the result of the determination of #33 (NO in #33), communication is attempted again between the mobile terminal K and the communication devices C1 to C6 (#31 to #32 in FIG. 3).

As in the examples shown in FIGS. 5 and 9, when there is one or more of the communication devices C1 to C6 which are communicable as the result of the determination of #33 (Yes in #33), the area determining unit 22 determines the area where the mobile terminal K exists by using the communication maps M1 to M6 (#34 in FIG. 3, the area determination step). In this area determination, the control unit 2 first reads the communication maps M1 to M6 shown in FIG. 6 from the storage unit 14 (#41 in FIG. 4). Next, the area determining unit 22 creates an existence area map of the mobile terminal K based on the logical product of the communicable ranges of the communication devices C1 to C6 which are determined by the signal processing unit 21 to be communicable (#42 in FIG. 4). It is preferable that the logical product of the communicable ranges of the communication devices C1 to C6 which are determined to be communicable use a range having a highly reliable ranging error of 0.5 m or less or 1 m or less. Next, the area determining unit 22 creates a non-existence area map of the mobile terminal K based on the logical product of the communicable ranges of some of the communication devices C1 to C6 which are determined by the signal processing unit 21 to be non-communicable (#43 in FIG. 4). It is preferable that the logical product of the communicable ranges of the communication devices C1 to C6 which are determined to be non-communicable use a range having a ranging error of more than 3 m so as to further narrow down the existence position of the mobile terminal K. That is, it is preferable that the area determining unit 22 makes the ranks of the communicable ranges of some of the communication devices C1 to C6 which are determined to be communicable different from the ranks of the communicable ranges of the other communication devices C1 to C6 which are determined to be non-communicable. Next, the area determining unit 22 excludes the non-existence area created in #43 from the existence area of the mobile terminal K created in #42, and outputs a two-dimensional map of the area where the mobile terminal K exists (#44 in FIG. 4).

Figure 7:
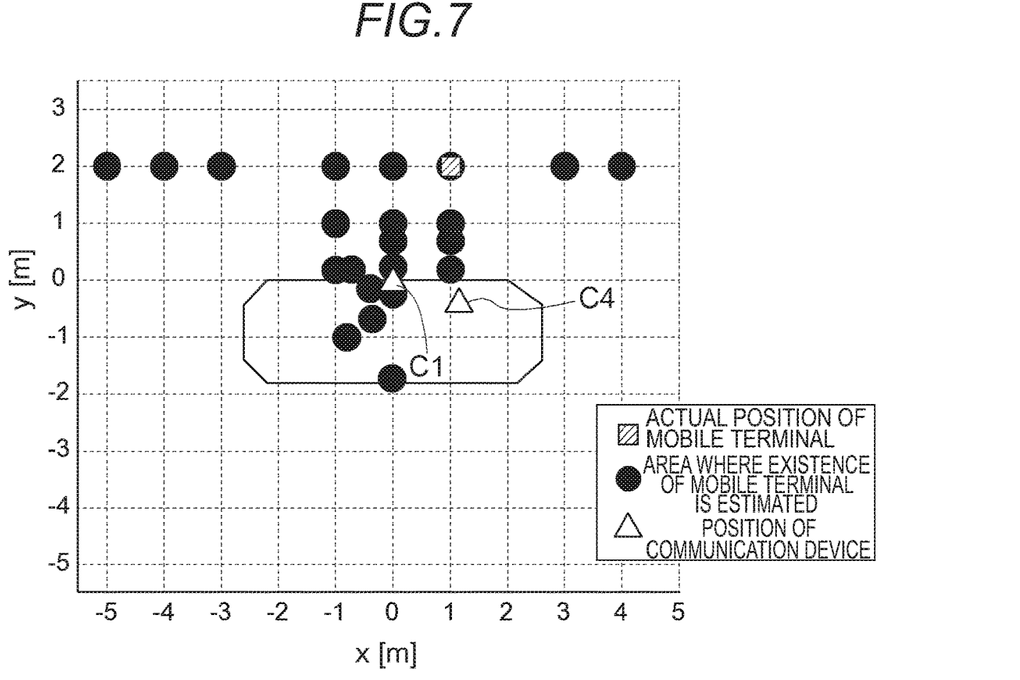
FIG. 7 is an example showing the existence area of the mobile terminal.

An example of the existence area of the mobile terminal K created by the area determining unit 22 is shown in FIG. 7. FIG. 7 shows a result obtained by excluding the logical product of the communicable ranges having a ranging error of 0.5 m or less and more than 3 m of the second communication device C2, the third communication device C3, the fifth communication device C5 and the sixth communication device C6 which are non-communicable, from the logical product of the communicable ranges having a ranging error of 0.5 m or less of the first communication device C1 and the fourth communication device C4 which are communicable shown in FIG. 5. In this embodiment, since the communicable range of the third communication device C3 excessively shifts toward the rear, it is determined that the mobile terminal K exists inside and outside the vehicle cabin. Therefore, the third communication device C3 is excluded from calculation targets, and the logical product of the communicable ranges having a ranging error of 0.5 m or less to 3 m or less of the second communication device C2, the fifth communication device C5 and the sixth communication device C6 which are non-communicable may be used. In such a case, the area inside the vehicle cabin is excluded, and it can be accurately determined that the mobile terminal K exists outside the vehicle cabin of the right door. Therefore, a pattern of superimposing the plurality of the communication maps M1 to M6 by performing a weighting based on the ranks of the communicable ranges of the communication devices C1 to C6 may be set by a deep learning method or a statistical method.

Figure 10:
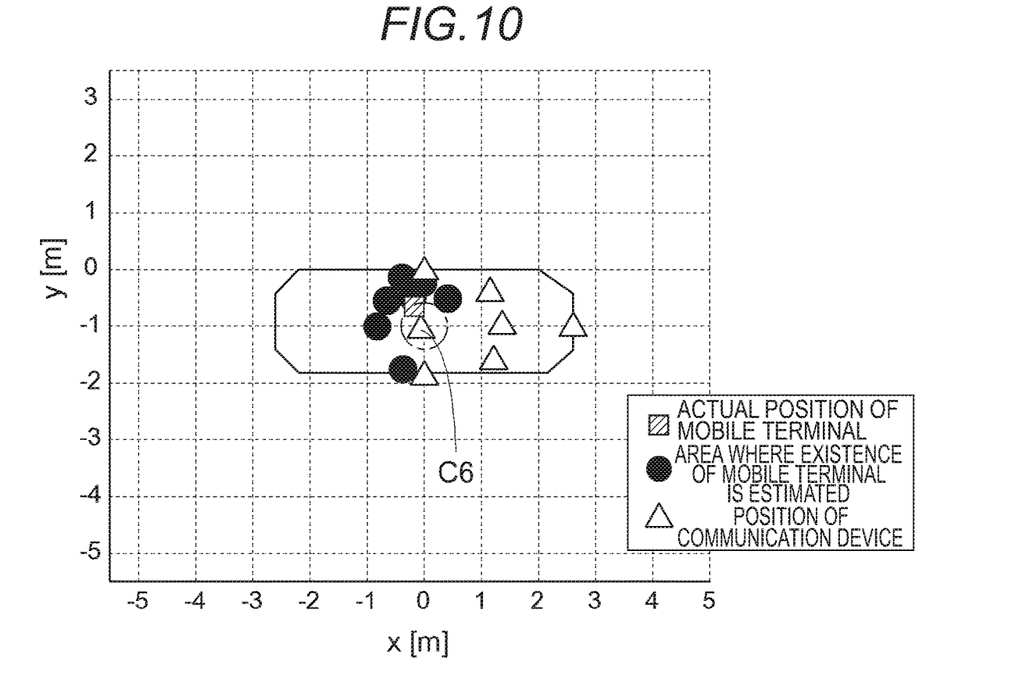
FIG. 10 is another example showing the existence area and the position estimation result of the mobile terminal.

Another example of the existence area of the mobile terminal K created by the area determining unit 22 is shown in FIG. 10. FIG. 10 shows a result obtained by excluding the communicable range having a ranging error of 0.5 m or less and more than 3 m of the third communication device C3 which is non-communicable from the logical product of the communicable ranges having a ranging error of 1 m or less of the first communication device C1, the second communication device C2 and the fourth communication device C4 to the sixth communication device C6 which are communicable shown in FIG. 9. As shown in FIG. 10, it can be accurately determined that the mobile terminal K exists inside the vehicle cabin. As described above, when only the third communication device C3 is non-communicable, it is preferable to exclude the third communication device C3 which is non-communicable from the logical product of the communicable ranges having the ranging error of 0.5 m or less or 1 m or less of the communication devices C1, C2 and C4 to C6 which are communicable. Therefore, it is preferable that the area determining unit 22 changes the pattern of superimposing the communication maps M1 to M6 according to the positions of the communication devices C1 to C6 provided in the automobile A.

Figure 8:
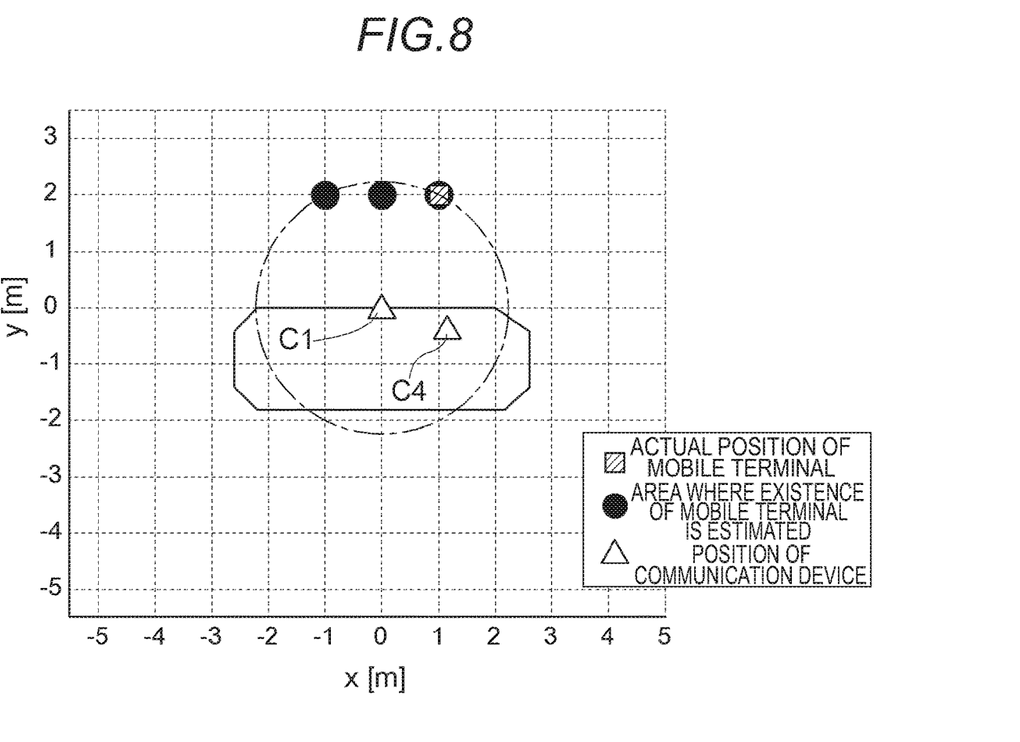
FIG. 8 is an example showing a position estimation result of the mobile terminal.

Returning to FIG. 3, the estimation unit 23 estimates the existence position of the mobile terminal K based on the determination result of the area determining unit 22 (#35 in FIG. 3, the estimation step). For this estimation, in the existence area of the mobile terminal K narrowed down by the area determining unit 22, the estimation unit 23 estimates a range existing in the existence area of the mobile terminal K of the estimation circle using the distance value from the communication devices C1 to C6 having the smallest distance value as a radius as the position of the mobile terminal K. In the example shown in FIG. 8, in the existence area of the mobile terminal K shown in FIG. 7, the estimation circle (the dashed line circle in FIG. 8) using the distance value from the first communication device C1 having the smallest distance value is drawn, and a range (black circles in FIG. 8) of this estimation circle that exists in the area is shown. The distance value from the first communication device C1 which is the radius of the estimation circle preferably uses the smallest distance value of distance values from the first communication device C1. As shown in FIG. 8, with respect to the actual existence position of the mobile terminal K (the diagonally painted square in FIG. 8), the estimation position of the mobile terminal K is included in an error range of 3 m in a front-rear direction of the automobile A, and it can be accurately estimated that the mobile terminal K exists outside the vehicle cabin of the right door. In the example shown in FIG. 10, in an estimation circle (the dashed line circle in FIG. 10) using a distance value from the sixth communication device C6 having the smallest distance value as a radius, the estimation positions of the mobile terminal K (black circles in FIG. 10) existing in the area is close to the actual existence position of the mobile terminal K (the diagonally painted square in FIG. 10), and it can be accurately estimated that the mobile terminal K exists on the driver seat in the vehicle cabin.

Returning to FIG. 3, the estimation unit 23 outputs the existence position of the mobile terminal K to the ECU 15, and based on this existence position, the ECU 15 executes a signal processing such as transmitting an operation signal to the door opening and closing mechanism 3 so as to unlock, lock, open or close the left door (#36 in FIG. 3).

Other Embodiments (1) In the above-described embodiment, the area determining unit 22 excludes the logical product of the communicable ranges of some of the communication devices C1 to C6 which are determined to be non-communicable by the signal processing unit 21 from the logical product of the communicable ranges of the other communication devices C1 to C6 which are determined to be communicable by the signal processing unit 21. Alternatively, the area determining unit 22 may determine the existence area of the mobile terminal K based on a logical product of the logical product of the communicable ranges of some of the communication devices C1 to C6 which are determined to be communicable by the signal processing unit 21 and a logical sum of non-communicable ranges of the other communication devices C1 to C6 which are determined to be non-communicable by the signal processing unit 21.

(2) Although the communication maps M1 to M6 in the above-described embodiment are created in consideration of the ideal ranging error in the absence of disturbance, the communication maps M1 to M6 may be created in consideration of a ranging error in the presence of disturbance. The ranging error in the presence of disturbance can be obtained by the statistical method or the deep learning method.

(3) Although a logistical method is used for superimposing the communication maps M1 to M6 by the area determining unit 22 in the above-described embodiment, by using a existence probability density map of the mobile terminal K which is statistically created based on the ranks of the communication errors, the communication maps M1 to M6 may be superimposed in a dense region of the existence probability density map. The existence probability density map of the mobile terminal K is preferably created by using the deep learning method or the like.

(4) Although the estimation unit 23 in the above-described embodiment creates the estimation circle using the distance value from the communication device of the communication devices C1 to C6 having the smallest distance value as a radius, the estimation circle may be created by the statistical method. In addition, the estimation circle may be created by using the deep learning method.

This disclosure is applicable to a position estimation method for a mobile terminal, a position estimation device for a mobile terminal and a position estimation system for a mobile terminal which estimate the position of a mobile terminal in the vicinity of a vehicle.

A position estimation method for a mobile terminal according to this disclosure is a position estimation method for a mobile terminal that estimates a position of a mobile terminal by communicating a plurality of communication devices provided in a vehicle with the mobile terminal in a vicinity of the vehicle, and the position estimation method includes: an acquisition step of acquiring distance values and radio wave intensity values between the plurality of communication devices and the mobile terminal by communicating the communication devices with the mobile terminal; a communication availability determination step of determining that a corresponding communication device is communicable when the distance value is equal to or less than a first predetermined value and the intensity value is equal to or more than a second predetermined value; an area determination step of, based on a determination result of the communication availability determination step and communication maps that map communicable ranges of the communication devices, determining an area where the mobile terminal exists by superimposing the communication maps; and an estimation step of estimating the position of the mobile terminal based on a determination result of the area determination step.

A position estimation device for a mobile terminal according to this disclosure is a position estimation device for a mobile terminal that estimates a position of a mobile terminal by communicating a plurality of communication devices provided in a vehicle with the mobile terminal in a vicinity of the vehicle, and the position estimation device includes: a signal processing unit configured to acquire distance values and radio wave intensity values between the plurality of communication devices and the mobile terminal by communicating the communication devices with the mobile terminal, and determine that a corresponding communication device is communicable when the distance value is equal to or less than a first predetermined value and intensity value is equal to or more than a second predetermined value; an area determining unit configured to, based on a determination result of the signal processing unit and communication maps that map communicable ranges of the communication devices, determine an area where the mobile terminal exists by superimposing the communication maps; and an estimation unit configured to estimate the position of the mobile terminal based on a determination result of the area determining unit.

A position estimation system for a mobile terminal according to this disclosure includes: a plurality of communication devices provided in a vehicle; a signal processing unit configured to acquire distance values and radio wave intensity values between the plurality of communication devices and a mobile terminal in a vicinity of the vehicle by communicating the communication devices with the mobile terminal, and determine that a corresponding communication device is communicable when the distance value is equal to or less than a first predetermined value and the intensity value is equal to or more than a second predetermined value; an area determining unit configured to, based on a determination result of the signal processing unit and communication maps that map communicable ranges of the communication devices, determine an area where the mobile terminal exists by superimposing the communication maps; and an estimation unit configured to estimate the position of the mobile terminal based on a determination result of the area determining unit.

In the method or in the configurations, based on the communication maps and the determination result of the communication availability determination step, an area where the mobile terminal exists is determined by superimposing the communication maps. That is, for example, if the communicable range of the communication device that is communicable is superimposed and a communicable range of a communication device that is non-communicable is excluded by using a communication map predetermined by an arrangement of the communication devices, the area where the mobile terminal exists can be divided into the inside and outside of the vehicle and can be narrowed down. Therefore, since the existence area of the mobile terminal can be narrowed down with high accuracy, the accuracy of estimation on the position of the mobile terminal can be improved.

In this way, it is possible to provide the position estimation method for a mobile terminal, the position estimation device for a mobile terminal, and the position estimation system for a mobile terminal which can improve the accuracy of estimation on the position of the mobile terminal.

Other feature of this disclosure is that, in the estimation step, a range existing in the area in an estimation circle whose radius is the distance value from the communication device having the smallest distance value is estimated as the position of the mobile terminal.

According to this method, it is estimated that in the area where the mobile terminal exists, the mobile terminal exists in the estimation circle that uses the distance value from the communication device having the smallest distance value with respect to the mobile terminal as a radius. That is, since the position of the mobile terminal is estimated by using the distance value of the communication device that is closest to the mobile terminal and has less communication error, the accuracy of estimation can be improved.

Other feature of this disclosure is that, in the area determination step, a logical product of the communicable range of the communication device determined to be non-communicable in the communication availability determination step is excluded from a logical product of the communicable range of the communication device determined to be communicable in the communication availability determination step.

As in this method, if the logical product of the communicable ranges of the communication devices determined to be non-communicable is excluded from the logical product of the communicable ranges of the communication devices determined to be communicable, a method for calculation is extremely simple, and a position estimation speed for the mobile terminal can be improved.

Other feature of this disclosure is that the communication map classifies the communicable ranges into ranks according to a degree of communication error, and in the area determination step, the plurality of the communication maps are superimposed by performing weighting based on the ranks.

As in this method, if the weighting is performed based on the ranks of the communicable ranges when the communication maps are superimposed in the area determination step, the existence area of the mobile terminal can be determined by dividing it into the inside and outside of the vehicle.

Other feature of this disclosure is that the area is defined by two-dimensional coordinates.

As in this method, if the existence area of the mobile terminal has the two-dimensional coordinates, a calculation load for estimating the position of the mobile terminal can be reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A position estimation method for a mobile terminal that estimates a position of a mobile terminal by communicating a plurality of communication devices provided in a vehicle with the mobile terminal in a vicinity of the vehicle, the method comprising:
    an acquisition step of acquiring distance values and radio wave intensity values between the plurality of communication devices and the mobile terminal by communicating the communication devices with the mobile terminal;
    a communication availability determination step of determining that a corresponding communication device is communicable when the distance value is equal to or less than a first predetermined value and the intensity value is equal to or more than a second predetermined value;
    an area determination step of, based on a determination result of the communication availability determination step and communication maps that map communicable ranges of the communication devices, determining an area where the mobile terminal exists by superimposing the communication maps; and
    an estimation step of estimating the position of the mobile terminal based on a determination result of the area determination step,
    wherein in the area determination step, the area where the mobile terminal exists is determined by superimposing one or more of the communication maps of the communication devices which are determined to be communicable in the communication availability determination step and one or more of the communication maps of the communication devices which are determined to be non-communicable in the communication availability determination step.

2. The position estimation method for a mobile terminal according to claim 1, wherein
    in the estimation step, a range existing in the area in an estimation circle whose radius is the distance value from the communication device having the smallest distance value is estimated as the position of the mobile terminal.

3. The position estimation method for a mobile terminal according to claim 1, wherein
    in the area determination step, a logical product of the communicable range of the communication device determined to be non-communicable in the communication availability determination step is excluded from a logical product of the communicable range of the communication device determined to be communicable in the communication availability determination step.

4. The position estimation method for a mobile terminal according to claim 3, wherein
the communication map classifies the communicable ranges into ranks according to a degree of communication error, and
in the area determination step, the plurality of the communication maps are superimposed by performing weighting based on the ranks.

5. The position estimation method for a mobile terminal according to claim 1, wherein
the area is defined by two-dimensional coordinates.

6. The position estimation method for a mobile terminal according to claim 1, wherein the distance values are determined using a time of flight method for the communications between the plurality of communication devices and the mobile terminal.

7. The position estimation device for a mobile terminal according to claim 1, wherein in the area determination step, the area where the mobile terminal exists is determined using the communication maps in a case where it is determined that any one of the communication devices is communicable in the communication availability determination step.

8. The position estimation device for a mobile terminal according to claim 1, wherein in the area determination step, the communication maps which are stored beforehand are read out for determining the area where the mobile terminal exists.

9. A position estimation device for a mobile terminal that estimates a position of a mobile terminal by communicating a plurality of communication devices provided in a vehicle with the mobile terminal in a vicinity of the vehicle, the device comprising:
a signal processing unit configured to acquire distance values and radio wave intensity values between the plurality of communication devices and the mobile terminal by communicating the communication devices with the mobile terminal, and determine that a corresponding communication device is communicable when the distance value is equal to or less than a first predetermined value and the intensity value is equal to or more than a second predetermined value;
an area determining unit configured to, based on a determination result of the signal processing unit and communication maps that map communicable ranges of the communication devices, determine an area where the mobile terminal exists by superimposing the communication maps; and
an estimation unit configured to estimate the position of the mobile terminal based on a determination result of the area determining unit,
wherein the area determining unit determines the area where the mobile terminal exists by superimposing one or more of the communication maps of the communication devices which are determined to be communicable by the signal processing unit and one or more of the communication maps of the communication devices which are determined to be non-communicable by the signal processing unit.

10. The position estimation device for a mobile terminal according to claim 9, wherein the distance values are determined using a time of flight method for the communications between the plurality of communication devices and the mobile terminal.

11. The position estimation device for a mobile terminal according to claim 9, wherein the area determining unit determines the area where the mobile terminal exists using the communication maps in a case where the signal processing unit determines that any one of the communication devices is communicable.

12. The position estimation device for a mobile terminal according to claim 9, further comprising a storage unit configured to store the communication maps which are read out for determining an area where the mobile terminal exists.

13. A position estimation system for a mobile terminal, the system comprising:
a plurality of communication devices provided in a vehicle;
a signal processing unit configured to acquire distance values and radio wave intensity values between the plurality of communication devices and a mobile terminal in a vicinity of the vehicle by communicating the communication devices with the mobile terminal, and determine that a corresponding communication device is communicable when the distance value is equal to or less than a first predetermined value and the intensity value is equal to or more than a second predetermined value;
an area determining unit configured to, based on a determination result of the signal processing unit and communication maps that map communicable ranges of the communication devices, determine an area where the mobile terminal exists by superimposing the communication maps; and
an estimation unit configured to estimate the position of the mobile terminal based on a determination result of the area determining unit,
wherein the area determining unit determines the area where the mobile terminal exists by superimposing one or more of the communication maps of the communication devices which are determined to be communicable by the signal processing unit and one or more of the communication maps of the communication devices which are determined to be non-communicable by the signal processing unit.

14. The position estimation system for a mobile terminal according to claim 13, wherein the distance values are determined using a time of flight method for the communications between the plurality of communication devices and the mobile terminal.

15. The position estimation system for a mobile terminal according to claim 13, wherein the area determining unit determines the area where the mobile terminal exists using the communication maps in a case where the signal processing unit determines that any one of the communication devices is communicable.

16. The position estimation system for a mobile terminal according to claim 13, further comprising a storage unit configured to store the communication maps which are read out for determining an area where the mobile terminal exists.

* * * * *